United States Patent
Kovari et al.

(10) Patent No.: US 11,805,043 B2
(45) Date of Patent: Oct. 31, 2023

(54) METHOD AND SYSTEM FOR REAL-TIME ENCRYPTED VIDEO QUALITY ANALYSIS

(71) Applicant: Telefonaktiebolaget LM Ericsson (publ), Stockholm (SE)

(72) Inventors: Andras Kovari, Sopron (HU); Attila Báder, Paty (HU); László Kovács, Martonvásár (HU); Gábor Magyar, Dunaharaszti (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/968,621

(22) PCT Filed: Jul. 9, 2018

(86) PCT No.: PCT/IB2018/055050
§ 371 (c)(1),
(2) Date: Aug. 10, 2020

(87) PCT Pub. No.: WO2020/012215
PCT Pub. Date: Jan. 16, 2020

(65) Prior Publication Data
US 2021/0051088 A1 Feb. 18, 2021

(51) Int. Cl.
*H04L 43/12* (2022.01)
(52) U.S. Cl.
CPC .................... *H04L 43/12* (2013.01)
(58) Field of Classification Search
CPC ........................................ H04L 43/12
See application file for complete search history.

(56) References Cited

U.S. PATENT DOCUMENTS

| | | | | |
|---|---|---|---|---|
| 9,609,042 | B1* | 3/2017 | Pallemulle | H04L 67/02 |
| 10,637,715 | B1* | 4/2020 | Vasilyev | H04L 41/0816 |
| 10,650,432 | B1* | 5/2020 | Joseph | G06Q 30/0631 |
| 2012/0254414 | A1* | 10/2012 | Scarpelli | G06F 11/3452 |
| | | | | 709/224 |

(Continued)

FOREIGN PATENT DOCUMENTS

EP 2934006 A1 10/2015

OTHER PUBLICATIONS

Wikipedia, "Types of Artificial Neural Networks," 2017. (Year: 2017).*

(Continued)

*Primary Examiner* — Andrew C Georgandellis
(74) *Attorney, Agent, or Firm* — SAGE PATENT GROUP

(57) ABSTRACT

Techniques for real-time encrypted over-the-top (OTT) data quality analysis are presented. For instance, the present disclosure includes an example method performed by a device in a recurrent neural network (RNN) implemented in a data communication system. The method includes periodically obtaining information corresponding to one or more OTT data sessions in the data communication system, the information being obtained from one or more of a packet probe, a test terminal, and a network node. The method also includes generating at least one quality metric associated with the one or more OTT data sessions based on the periodically obtained information. Related devices, processor and memory arrangements, methods, and computer programs are also presented.

10 Claims, 12 Drawing Sheets

(56) References Cited

U.S. PATENT DOCUMENTS

| | | | | |
|---|---|---|---|---|
| 2013/0067109 A1* | 3/2013 | Dong | .................... | H04L 65/61 |
| | | | | 709/231 |
| 2013/0346453 A1* | 12/2013 | Procopio | ............ | G06F 16/1794 |
| | | | | 707/809 |
| 2015/0332198 A1* | 11/2015 | Toro | .................. | G06Q 10/0637 |
| | | | | 705/7.39 |
| 2016/0028752 A1* | 1/2016 | Di Pietro | ............ | H04L 63/1416 |
| | | | | 726/23 |
| 2016/0373950 A1* | 12/2016 | Niemoeller | ............. | H04L 65/80 |
| 2017/0091615 A1* | 3/2017 | Liu | ..................... | G06N 3/0445 |
| 2017/0093648 A1* | 3/2017 | ElArabawy | ......... | H04L 43/0817 |
| 2017/0250887 A1* | 8/2017 | Sadana | .................. | H04L 43/10 |

OTHER PUBLICATIONS

PCT International Search Report and Written Opinion dated Mar. 14, 2019 for International Application PCT/IB2018/055050, 11 pages.

Maraga, A. et al., "Using Deep Learning Technologies to Provide Descriptive Metadata for Live Vedio Contents", XP055564341, Sep. 19, 2017, 10 pages, Italy.

* cited by examiner

METHOD AND SYSTEM FOR REAL-TIME ENCRYPTED VIDEO QUALITY ANALYSIS

CROSS-REFERENCE TO RELATED APPLICATIONS

This application is a 35 U.S.C. § 371 national stage application for International Application No. PCT/IB2018/055050, entitled "METHOD AND SYSTEM FOR REAL-TIME ENCRYPTED VIDEO QUALITY ANALYSIS", filed on Jul. 9, 2018, the disclosures and contents of which are hereby incorporated by reference in their entireties.

TECHNICAL FIELD

The present application relates to methods and apparatuses for real-time encrypted over-the-top (OTT) data quality analysis, and in particular, for video delivered as a mobile broadband service.

BACKGROUND

Video is one of the most important drivers of mobile telecom business today—and as with many other forms of data, companies who produce OTT video services have seen an increased demand for supporting end-to-end encryption on their platforms. With this growing expectation, and projections that mobile video traffic will grow by around fifty percent annually through 2023 to eventually account for seventy-five percent of all mobile data traffic, there is likely to be a high demand for systems that can deliver encrypted OTT video data The high-quality mobile broadband service is an expectation from both the OTT service providers and the end user side, and it is considered as key business factor. Therefore, mobile network operators take special care to monitor service quality and to improve their networks in order to provide a high-quality video service from both the client and operator perspective. With that in mind, video quality metrics have become very important to ensure a high level of quality is maintained from end to end and can be obtained at the end device or based on traffic collected at the end devices. As described further below, however, the application of these methods is quite limited.

Presently, to monitor the quality of large number of OTT flows, mobile network operators apply traffic probes that collect different metrics of the OTT flows and estimate/calculate OTT data (e.g., video) key performance indicators (KPIs). A current challenge in this area is that different service providers use different video encoding techniques or protocols, which are changed from time to time. Accordingly, the video KPIs must be tuned for each of the encoding techniques used by all OTT service providers and types. Another significant challenge with the current paradigm is that the video content is now encrypted, therefore there is no possibility to sample the content directly in the network probes.

To date, terminal- or user-equipment-based techniques for monitoring a large number of OTT flows have been generally unsuccessful—often because it requires agreement of subscribers to deploy the monitoring software on their terminal (also referred to herein as user equipment (UE)). In addition, the processing capacity of the mobile terminals is limited and any OTT flow monitoring application would divert non-negligible resources from other user applications, among other factors that make such a solution impractical.

Furthermore, existing machine-learning-based techniques exclusively utilize network node events (e.g., Radio Access Network (RAN) events such as cell handover, etc.) to infer network and OTT data flow conditions. These existing techniques also require interfaces to access the network nodes and also require different types of data from multiple data sources. Moreover, these techniques are driven by buffer state models using packet probe traffic reports as input, where the models are based on predefined rules and model parameters determined by offline data analysis or laboratory measurements instead of actual measurements inside the particular communication environment. In addition, the model parameters vary significantly among OTT service providers—not to mention that the data flow packet encoding can change over time. Accordingly, it requires a gargantuan amount of effort and expert knowledge to determine and maintain the parameters for the large number of OTT service providers.

One significant limitation of the existing machine-learning techniques is that each provides only a single metric (e.g. Mean Opinion Square (MOS), or per-session KPIs) for an entire session, which does not provide a sufficient level of granularity for the network devices to determine and troubleshoot specific issues with OTT flows.

Accordingly, improvements are necessary to allow modern networks to identify fault points in an OTT data delivery path such that any issues can be more easily addressed to improve user experience.

SUMMARY

The present disclosure presents a real-time video quality analytics system a neural network based and method for mobile networks is proposed with an automatic learning mechanism, which can adapt automatically to video encodings used by different OTT service providers and adopt to any changes of video encoding during operation. For instance, the present disclosure describes a method performed by a device in a recurrent neural network (RNN) implemented in a data communication system. In an aspect, the example method includes periodically obtaining information corresponding to one or more over-the-top data sessions in the data communication system, the information being obtained from one or more of a packet probe, a test terminal, and a network node. In addition, the method includes generating at least one quality metric associated with the one or more OTT data sessions based on the periodically obtained information.

The disclosure also presents an example method performed by a testing terminal in an OTT data communication system. The method includes conducting an ongoing OTT data session with each of a group of available OTT service providers. In addition, the method includes, for each ongoing OTT data session, measuring one or more OTT data quality metrics. Furthermore, the example method includes periodically reporting the one or more OTT data quality metrics for each ongoing OTT data session to a RNN associated with the OTT data communication system.

In addition, the disclosure describes an example device in an RNN implemented in a data communication system. In an aspect, the device is configured to periodically obtain information corresponding to one or more OTT data sessions in the data communication system, the information being obtained from one or more of a packet probe, a test terminal, and a network node. Furthermore, the device is configured to generate at least one quality metric associated with the one or more OTT data sessions based on the periodically obtained information.

Moreover, the disclosure presents an example testing terminal in an OTT data communication system. In an aspect, the testing terminal is configured to conduct an ongoing OTT data session with each of a group of available OTT service providers. Furthermore, the testing terminal is configured, for each ongoing OTT data session, to measure one or more OTT data quality metrics. Additionally, the example testing terminal is configured to periodically report the one or more OTT data quality metrics for each ongoing OTT data session to an RNN associated with the OTT data communication system.

These and additional example embodiments will now be described in reference to the figures that follow.

DETAILED DESCRIPTION

Figure 1:
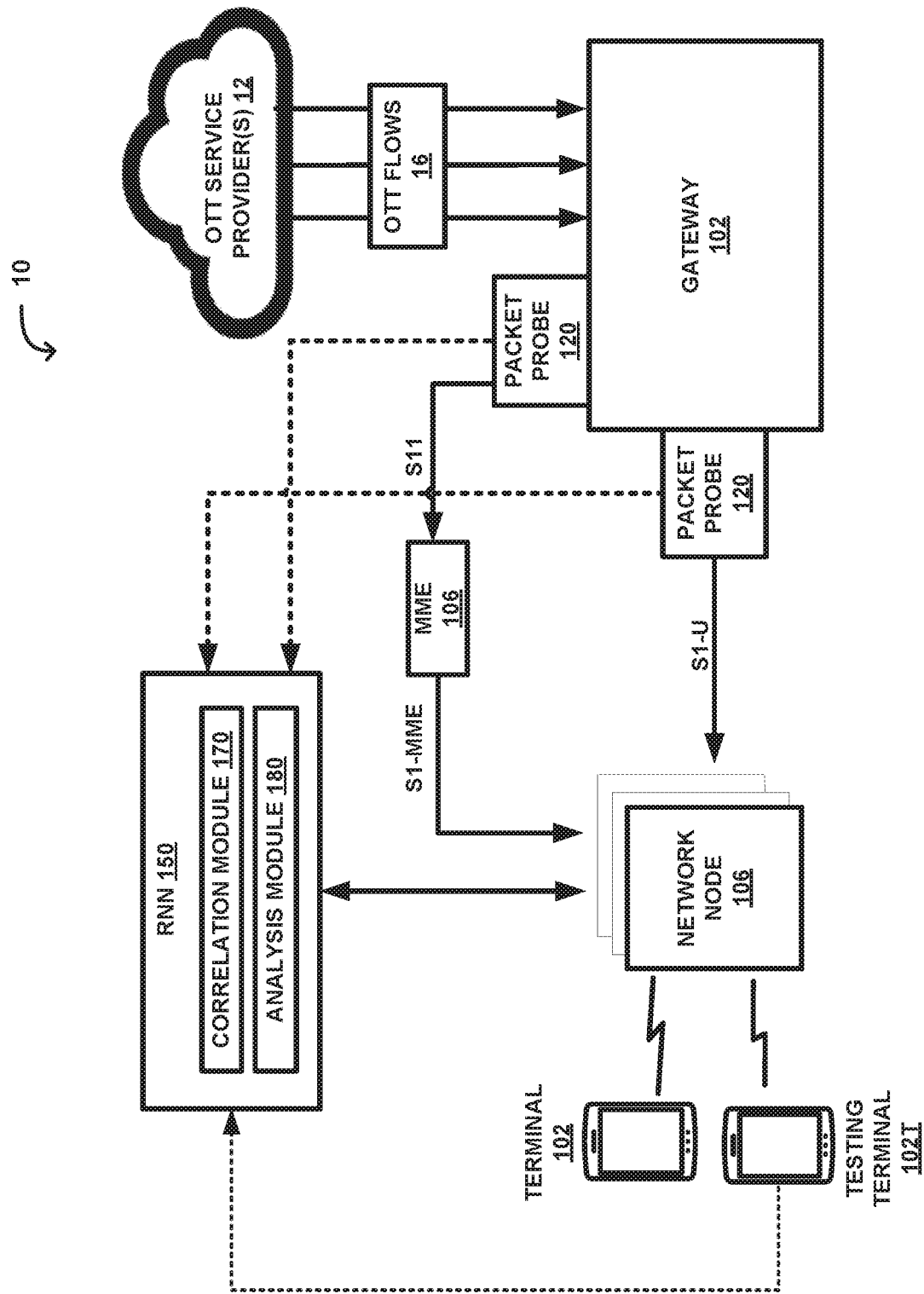
FIG. 1 illustrates an OTT data communication system corresponding to example embodiments of the present disclosure.
Figure 2:
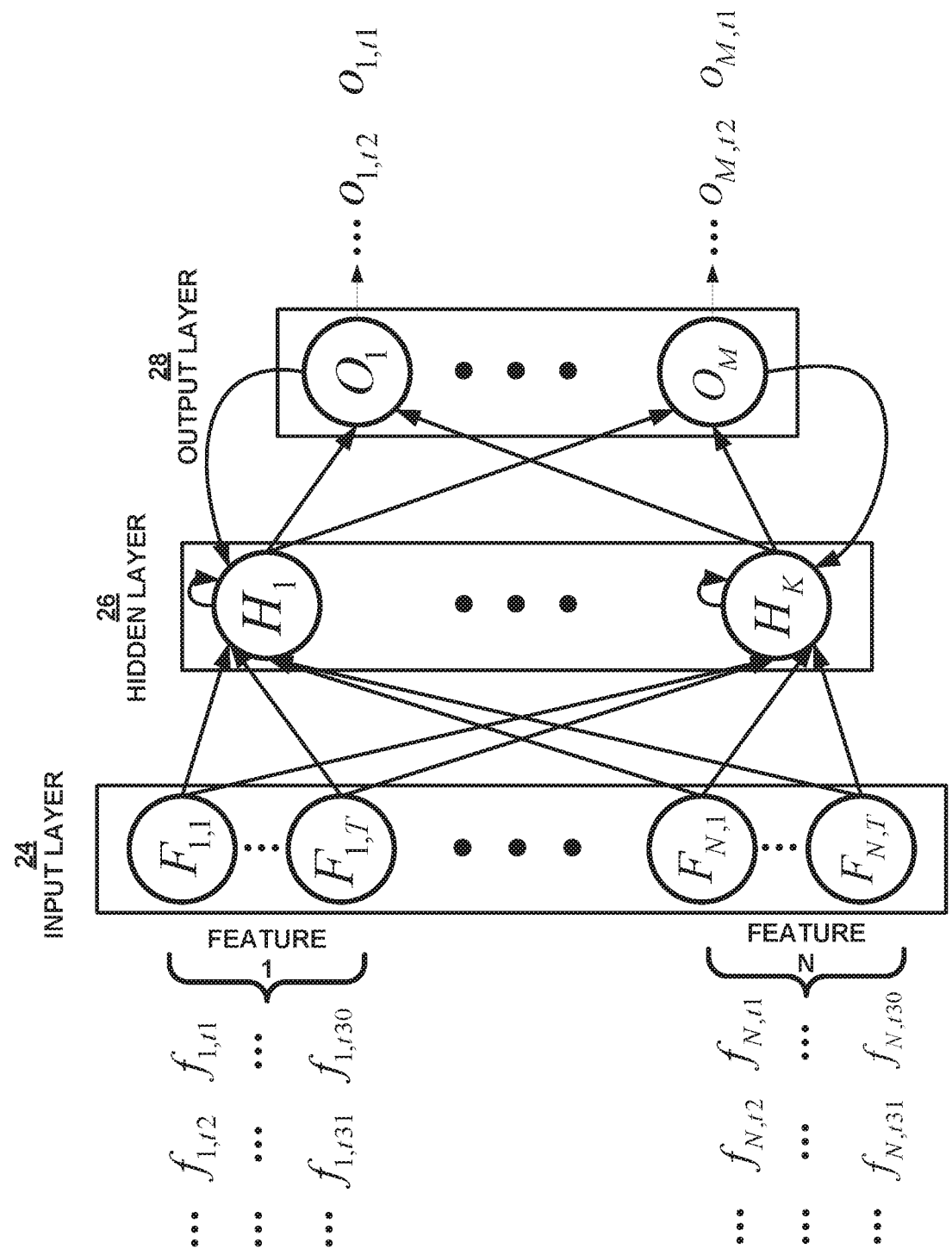
FIG. 2 illustrates a representation of a recursive neural network utilized in example embodiments of the present disclosure.

The present disclosure introduces a data communication system that implements a recurrent neural network (RNN)-based real-time encrypted OTT data (e.g., video) quality analytics system automatic learning mechanism that can adapt automatically to encoding types used by different OTT service providers. The system uses fine granularity flow quality metrics for encrypted OTT data enabling troubleshooting and analytics use-cases. In examples where the OTT data is video data, video quality metrics include the initial buffering time, rebuffering or stall time ratio, video resolution.

The video quality analysis is based on relatively fine granularity (e.g. one to two seconds) packet probe records, including transport activity, throughput, and Transfer Control Protocol (TCP) metrics, along with relevant network node events (handovers, etc.) and fine granularity measurement reports. The video quality metrics are estimated real-time by a recurrent neural network (RNN), which uses packet probe records and node events as a periodic and/or an event-based input feed. Because of the relatively fine temporal granularity of the metric generation and OTT flow analysis by the RNN, the proposed solution described herein enables cross-domain root cause identification, analysis, and troubleshooting of encrypted OTT video session problems.

In an aspect of example embodiments described herein, at least one packet probe is deployed in or adjacent to the gateway node(s) of the network and configured to capture OTT-based traffic of the full network and providing packet probe reports separately for each OTT data session (also referred to herein as an OTT data flow). In an aspect, radio events and measurement reports are collected for all or part of the network and are correlated to the OTT data sessions. The RNN is further configured to implement adaptive learning based on a limited number of test terminals spread around the network. The test terminals run a terminal application that is configured to measure and report quality metrics, user experience parameter levels, and/or other relevant metrics. The weights of the RNN connections can be updated continuously based on the feedback of test terminal (also referred to herein as test user equipment). In addition, the RNN can utilize the data input from the one or more packet probes, the test terminals, and network nodes root cause analysis additional node and network events are correlated to the identified quality issues.

Unlike existing solutions, there is no need to develop and maintain models separately for each OTT service provider in the present embodiments. Instead, the example embodiments presented herein can automatically learn based on feedback from previous inbox data and adapts to encoding changes accordingly. In addition, the RNN can be configured to automatically recognize, decipher, and learn new video encoding types of OTT service providers.

Using these and other techniques described herein, the proposed solution identifies video/OTT data quality issues in effectively real time (one to two second granularity in some examples) and for all subscribers. Given these features of the present disclosure, the method can be used for customer care services, troubleshooting, network analysis and optimization, and as input to closed-loop network optimization self-organizing network (SON) features. Ultimately, the output of the system described herein can be used to localize the quality issues within the session with high accuracy such that painless and swift root cause analysis can be conducted for system optimization.

FIG. 1 illustrates a data communication system 10 that is configured to communicate over-the-top (OTT) data from one or more OTT service providers 12 to one or more UEs 102. As shown in FIG. 1, to receive OTT data 16 from the one or more OTT service providers 12, the one or more UEs 102 communicate wirelessly with at least one radio access network (RAN) 12 via a network node 106 (also referred to as radio network node or device, e.g., an eNB, gNB, base station, nodeB, etc.). In addition to traversing the RAN 12 on its last leg of its path from its corresponding OTT service provider 12, the OTT data 16 also traverses core network devices, including a gateway 107 (over S1-U interface) and, in some instances, Mobility Management Entity (MME) 108 over S11 and S1-MME interfaces. The gateway 107 can interface with the one or more Internet-based OTT service providers 12.

In a further aspect of the disclosure, on its path from the OTT service providers 12 to the one or more UEs 102, the OTT data 16 can encounter one or more packet probes 120 configured to perform packet inspection (e.g. Deep Packet Inspection (DPI)), which can include analyzing the data packets of the OTT data 16 to determine characteristics of the OTT data streams traversing the data communication system 10. In particular, the packet probes 120 can be configured to parse the OTT data streams to determine a type of encryption used by the OTT service providers 12 in each data stream (also referred to herein as "session"), among other characteristic information.

In some instances, the packet probe or probes 120 can be entities or modules inside a network device (e.g., gateway 107) such that the device performs multiple functions (i.e., gateway functionality and probe functionality). Alternatively, the one or more packet probes 120 can be stand-alone devices. Furthermore, different packet probes 112 may be located logically and/or physically on different communication interfaces and may be tasked with obtaining specific information pertinent to the overall OTT data traffic quality analysis. For instance, in an example embodiment shown in FIG. 1, OTT data traffic 100 (e.g., video data traffic) is captured by a first packet probe 120a at the S1-u interface, which communicatively couples the gateway 107 to the network node 106 of the RAN 12 serving one or more destination UEs 102 that are to receive the OTT data in the probed data flow/session. This first packet probe 120a on the S1-u interface can be configured to classify the OTT traffic of the different OTT sessions/flows by destination/target IP address(es) and/or port(s). In addition, as is likewise shown in the example embodiment of FIG. 1, a second packet probe 120b can be situated on the S11 interface to capture GTP-C signaling, which associates a particular video session to a particular user and/or user equipment 102.

In addition, the one or more packet probes 120 can include different probe types that broaden the functionality of the packet probe 120. For example, in some embodiments, the one or more packet probes 120 can include an Evolved Packet System (EPS) Encryption Algorithm (EEA) probe, which can be configured to classify Transmission Control Protocol (TCP) data, such as OTT data 16, according to originating OTT service provider 12, subscriber identity (i.e. of the terminating terminal 102), operator identity (i.e., of the RAN serving the terminating terminal 102), and the like. In some examples, an EEA correlator can be included in the one or more packet probes 120 to detect individual video session boundaries and to extend the transport layer information with RAN events and measurement reports. For purposes of the present disclosure, where In addition, the one or more packet probes 120 can include a General Packet Radio Service (GPRS) Tunneling Protocol (GTP) probe, which can be configured to generate fine-granularity transport layer information (called Transport layer Session Records (TSRs)) for each video session that is analyzed. Specifically, the transport layer information available in these TSR reports can include one or more of the following (which forms a non-limiting list):
  A total number of active connections in a current time period
  A time duration elapsed for connection setup
  A time duration elapsed for data transfer
  A time elapsed for zero-window waiting
  Connection start and/or end events
  Acknowledged bytes in the uplink direction for TCP
  Estimated acknowledged bytes for Quick User Datagram Protocol (UDP) Internet Connections (QUIC)
  Acknowledged bytes in downlink direction for TCP, estimated Acknowledged bytes for QUIC
  Hints for eventual connectivity outages preceding the current time period
  One or more types of active time statistics for the current time period
  One or more types of maximum delay statistics for this period
  Network events
  Transport layer events The information introduced above (or a subset thereof) can be generated by the one or more packet probes 120 according to a probing periodicity and/or based on one or more triggers, including event triggers (e.g., a particular parameter value reaches or drops below a threshold value for that parameter). In some examples, the packet probes can process OTT data and generate information and video session-specific performance parameter values at a temporal granularity of approximately one to two seconds. In other examples, the granularity may, for performance or feasibility reasons, be greater than two seconds or less than one second. This probing periodicity can be configured by a network operator and/or may be dynamic and negotiated among the different networks (e.g., RANs) in the system 10 based on current system conditions.

In a further aspect, the data communication system 10 includes one or more test terminals 102T that are configured to observe OTT data communication conditions at the test terminal location as well as identify certain events of consequence to the overall analysis of the OTT data delivery of the system as a whole. Accordingly, like the one or more packet probes 120 introduced above, the test terminals 102T are configured to generate and output data to the RNN 150 that is germane to the ultimate system analysis and the corresponding data generated by the RNN 150 that is utilized for problem point identification and potential rectification. In an aspect, set of data and/or events monitored by the test terminals 102T can include, but is not limited to the TSR parameters discussed above (e.g., in relation to the one or more probes 120), radio and/or overall call measurements, certain radio events such as, but not limited to, call/link drops, cell handovers, reselection (therefore including some of the same events that can be used for RCA purposes, see below), etc.

In an aspect, the test terminals 102T can be configured to explicitly measure OTT data quality metrics, and based on these metrics, can generate a record for each OTT data session. Furthermore, in some instances, the test terminals 102T can maintain a list of known OTT service providers as well as general and OTT-service-provider-specific video encoding schemes in order to identify and process the OTT data according to such encryption schemes. Furthermore, to maximize the set of training data available to the RNN 150, the test terminals 102T continuously run OTT data sessions for the existing OTT services and sites and report the information garnered from these sessions to the RNN 150.

In case of change in encoding scheme for the OTT data, the test terminals can begin measuring the new traffic type and provide quality metrics for the new encoding. Furthermore, in the case of a new OTT service or OTT service provider, the terminals can explicitly be requested to run OTT data sessions for the new traffic types to ensure training samples are generated for the new traffic type in short order (e.g., within one hour or the like).

In addition, the test terminals 102T can be placed geographically in a manner that maximizes knowledge of the system footprint. Accordingly, in addition to the information output to the RNN 150 from the one or more packet probes 120, the test terminals 102T can provide important information to be utilized by the RNN 150 to better understand the behavior of the system 10 and to more clearly and more quickly identify particular problem paths, interfaces, devices, or the like so that these problems can be addressed (or avoided through routing techniques) to improve the performance of the system as a whole. The number of test terminals 102T and test sessions may bel orders of magnitude less than the number of analyzed OTT data sessions for the whole system. As an example, with 100 test terminals the OTT data sessions of 50 million subscribers can be analyzed. This allows, for example, a system 10 with 100 test terminals 102T to analyze the OTT data sessions of 50 million subscribers while having a much smaller overhead footprint than if all terminals and/or OTT sessions were leveraged for this test terminal function.

In addition to information output by test terminals 102T and the one or more packet probes 120, additional information can be obtained by one or more network nodes 106 and provided to the RNN 150 to improve its performance and overall analysis of the system 10. In an aspect, each of the one or more network nodes 106 can be, in some non-limiting embodiments, nodeBs, eNodeBs (eNBs), gNBs, or other network-side devices that can obtain gainful information regarding the OTT data flow through the system 10. In particular, the network nodes 106 can be configured to conduct radio measurements and detect network node events (i.e. terminal handovers, etc.). In an aspect, the node events and probe records from the one or more packet probes 120 can be are correlated by the RNN 150 in a per-session record in its analytics system. According to example embodiments, information that is collected by the network nodes 106 and correlated with probe records can include (non-limiting list):

Downlink radio environment measurements, including but not limited to serving and neighbor Reference Signal Received Power (RSRP), Reference Signal Received Power (RSRQ), Signal to Interference and Noise Ratio (SINR Radio Resource Control (RRC) connect and release messages x2 and s1 handover attempts and execution messages Hybrid Automatic Repeat Request (HARQ) measurements By correlating these OTT data quality metrics with the radio events and measurements, the RNN 150 can provide a set of probable or real high-level root causes of performance issues, such as a lack of coverage, interference, x2 or s1 handover issues, cell dominance problems, HARQ rate issue, and others (not limiting).

Moreover, as introduced above, data communication system 10 includes a recurrent neural network (RNN) 150 configured to obtain a variety of information from other devices in the system 10 and, based on the obtained data, draw conclusions about OTT data flow conditions and overall system behavior and to improve its accuracy and performance over time. For example, the RNN 150 can receive information (see above) the one or more packet probes 120, one or more network nodes 106 or other network-side devices (e.g., in the core network), one or more user terminals 102, including test terminals 102T, or any other device in system 10 (or external thereto).

Specifically, in some examples, information input of the RNN 150 can be structured via a sliding time window (e.g., 10-30 seconds), with the information including the one-second probe report(s) extended with parameters input from other sources, including the radio network measurements from the test terminals 102T, other network nodes 106, and including network events including those listed above. In some examples, the sliding window is stepped each second, though stepping using other time intervals is possible in some examples.

As introduced above, the RNN 150 is configured to analyze the input information from the above-recited sources to analyze overall system performance and identify problem locations in the system 10 such that they can be rectified. FIG. 3 is a neural network diagram showing the logical structure of the RNN 150, which includes an input layer 24, a hidden layer 26, and an output layer 28. In an aspect, the input layer 24 constitutes a logical representation of the correlation module 170 wherein the parameters input from external entities (e.g., one or more packet probes 120, network nodes 106, and testing terminals 102T) are grouped according to OTT flow 16, time, packet order, and the like such that the later layers are provided with properly organized information. The hidden layer 26 includes feedback that encapsulates the previous state of the RNN in the decision making. The output layer 28 corresponds to the OTT (i.e., video) quality metrics utilized for system analysis: video buffering, video stall ratio (indicating that video is frozen), video resolution, and the like for video as OTT data implementations. Furthermore, the RNN 150 can include an analytics system that implements a correlation function. In an aspect, the correlation function matches the received probe records/information in real time with the events corresponding to the same OTT data session but potentially generated by and obtained from one or more test terminals 102T and optionally from other nodes 106. In order to capture late events and match them to a correct OTT data session, the correlation function waits for events for at least a time out period (which can be on the order of, but not limited to, 30-60 seconds).

Once generated, the correlated event records can be sent to an analyzer 145 of the analytics system in RNN 150, which is configured to parse the obtained data and output performance and characteristic data of OTT sessions, devices, locations, networks, etc. of the system 10. In addition, the analyzer 145 can aggregate the OTT data quality KPIs at different dimensions or levels of scale, such as nodes, cells, terminal types, OTT service provider, and the like. In a further aspect, the analytics system can store correlated records for different time periods, which allows the aggregated data to be drilled down to the particular dimension instances. This is used for localizing and deriving the high-level root cause the OTT data quality issues identified by the analytics system of the RNN 150. For example, if OTT data quality is less than optimal for certain node instances, and radio signal parameters (RSRP) are bad for the same node instances, than the most probable root cause of the OTT data quality issue is the bad coverage in the area of the given cells.

In another feature of the present disclosure, the OTT data quality KPIs can be aggregated for terminal types and drilled down to terminal type instances. This drill-down can lead to several insights into the root causes of certain issues with OTT delivery performance. For example, if it is determined by the RNN 150 that OTT data quality is significantly worse for a specific terminal type than that for the other terminal types, the RNN 150 can indicate that the root cause of the OTT data quality issue is terminal issue such as terminal model incompatibility.

In a further aspect, certain quality metrics are generated by RNN 150 in real time or approximately real time based on the actual junction weight between the neurons of the RNN. In some instances, the OTT data quality KPIs are calculated continuously during the session based on the quality metrics. The OTT data quality issues are often associated with specific radio conditions, such as low signal strength, interference, or simply to a handover event. Therefore, the test terminals 102T adding these parameters to the RNN input sequence significantly increase the accuracy of the prediction of the quality metrics.

Furthermore, in parallel to the packet probe data analysis process, the RNN 150 and its composite nodes are continually trained based on the OTT data sessions captured by the test terminals 102T. The training samples include existing OTT data encodings that continuously strengthen the existing coupling of the neurons, and as new OTT data encodings are utilized by OTT service providers, a larger number of training sequences of the new OTT data types are also sent to the RNN 150 in due course. This introduction of new OTT encoding schemes into the training data input into the RNN 150 modifies the existing neuron coupling in a way that generates appropriate quality metrics for the new OTT data types. In some examples, in operation, the one or more packet probes can recognize new OTT encoding types or schemes and can explicitly request the test terminals to generate test samples for the new traffic type, accelerating the learning process on the part of the RNN 150. As time progresses and the RNN 150 adapts accordingly, the weights for the unused OTT data types are gradually unlearned.

In an aspect, the output of the RNN 150 is generated at the rate at which the information is output by the one or more packet probes 120. For instance, in some examples, should the one or more packet probes 120 output information every second, the RNN 150 can output the video quality metrics every second as well. The RNN output is used for calculating the video quality KPIs, such as initial buffering time, stall time ratio, and the like. Accordingly, the RNN 150 is configured to continuously update its output data values informed by previous values input by the one or more packet probes 120 and test terminal 102T measurements. Therefore, as introduced in the context of the devices, networks, and interfaces of the system 10 of FIG. 1, the features of the present disclosure allow a system to leverage an RNN 150 to analyze and improve system operation and OTT data delivery.

Figure 3A:
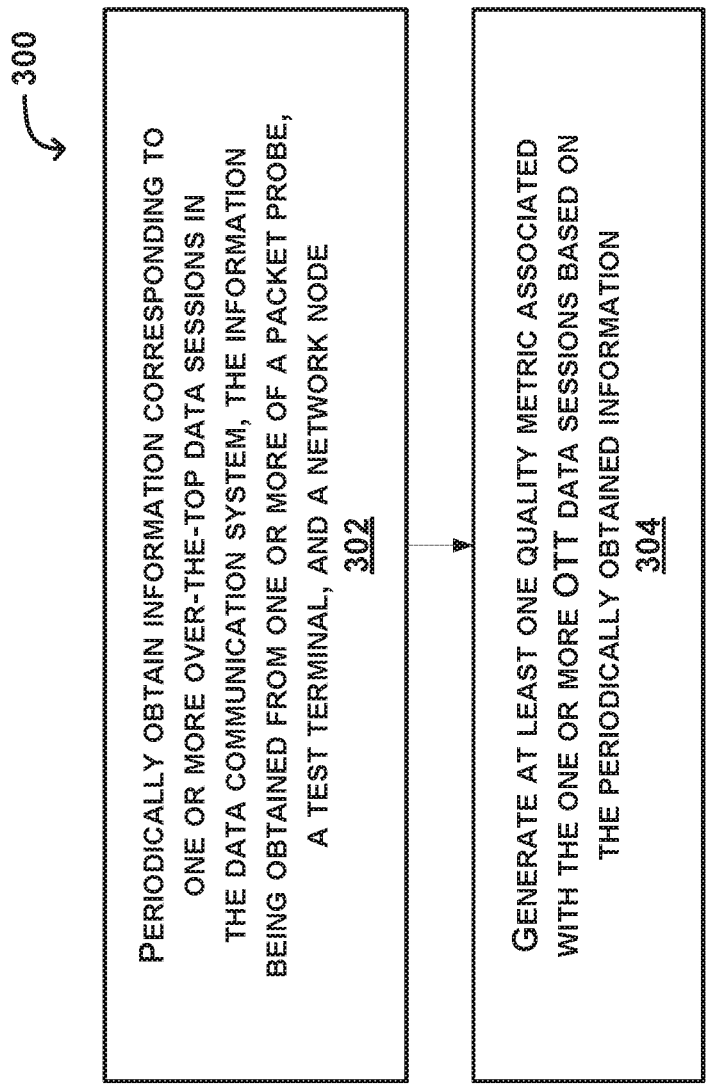
FIGS. 3A and 3B each illustrate example methods performed according to one or more embodiments.

FIG. 3A illustrates an example method 300 performed by a device 152 in a recurrent neural network RNN 150 implemented in a data communication system 10. In an aspect, at block 302 method 300 can include periodically obtaining information corresponding to one or more over-the-top OTT data sessions 16 in the data communication system. As introduced above, the information at block 302 can be obtained from one or more of a packet probe 120, a test terminal 102T, and a network node 106. Furthermore, the method 300 can include, at block 304, generating at least one quality metric associated with the one or more OTT data sessions 16 based on the periodically obtained information.

In addition, method 300 can include additional or alternative aspects that are not explicitly shown in FIG. 3A, including those that follow. For instance, in some examples, the generating aspect of block 304 can further include analyzing a sliding temporal window of the obtained information, and in a further aspect, the sliding window can be temporally moved periodically. In addition, the method 300 can include in some instances aggregating the at least one quality metric according to defined categories and identifying a root cause of an issue with one or more OTT data sessions based on the aggregated at least one quality metric.

In some instances of method 300, the information is obtained from two or more sources and can further include correlating the information received from the two or more sources to a same OOT data session and/or time. The method 300 can also include periodically calculating OTT data quality key performance indicators based on the generated at least one quality metric. Furthermore, periodically obtaining the information at block 302 can include receiving at least some of the information once every second. Additionally, in some example embodiments, the at least one quality metric comprises a data buffering level and/or a data stall time metric.

Furthermore, in some instances, the RNN 150 can include a hidden layer 26 managing feedback representing a previous state of the RNN 150. In addition, in some examples, the method 300 can include continually training the RNN 150 based on the obtained information, including the feedback information obtained, managed, and/or stored at the hidden layer 26. In addition, in some examples, generating the at least one quality metric is based on a junction weight of neurons of the RNN 150.

Figure 3B:
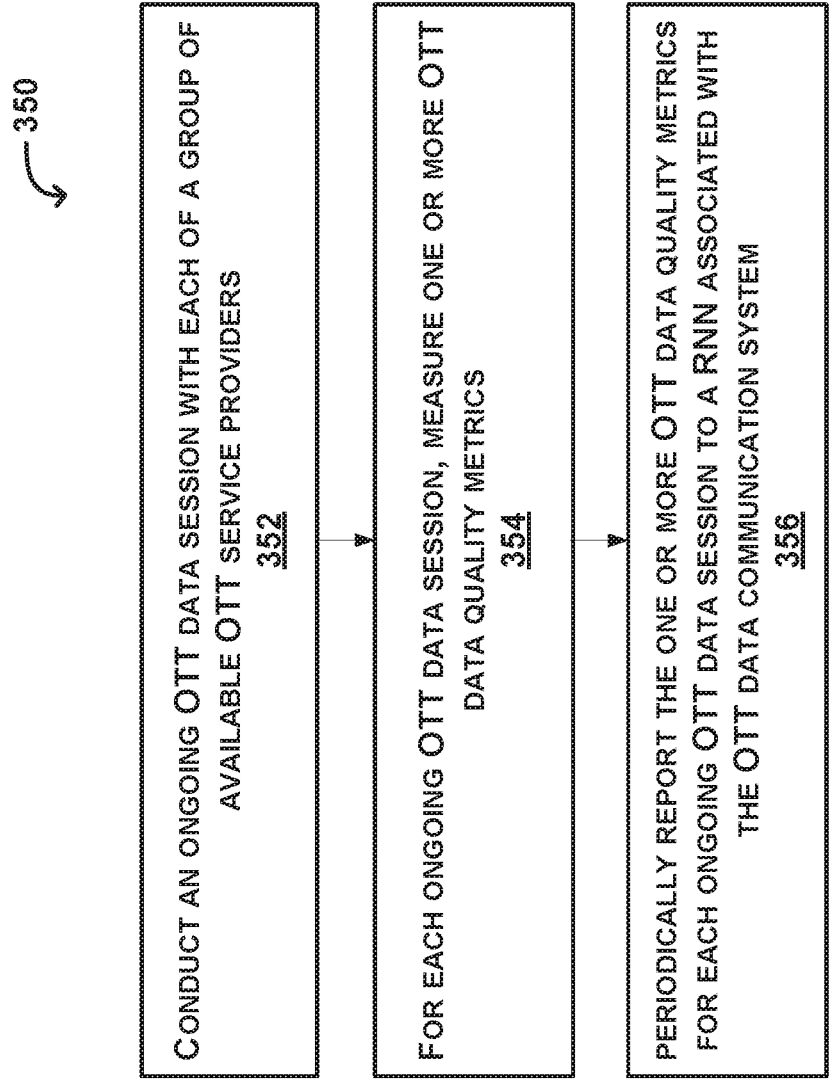

FIG. 3B illustrates another example method 350 performed by a test terminal 102T in an OTT data communication system 10. In an aspect, the method 350 can include, at block 352, conducting an ongoing OTT data session 16 with each of a group of available OTT service providers 12. In addition, at block 354, method 350 can include, for each ongoing OTT data session 16, measuring one or more OTT data quality metrics. Furthermore, at block 356, method 350 can include periodically reporting the one or more OTT data quality metrics for each ongoing OTT data session 16 to a recurrent neural network RNN 150 associated with the OTT data communication system 10.

In addition, method 350 can include additional or alternative aspects that are not explicitly shown in FIG. 3B, including those that follow. For instance, some examples of method 350 can include maintaining a list of encoding formats used by each of the OTT service providers 12. Likewise, method 350 can include maintaining a list of the available OTT service providers 12 in some examples. Furthermore, the method 350 can include reporting the list of encoding formats and/or the list of available OTT service providers 12 to the RNN 150.

In addition, in some examples, method 350 can include determining that a new encoding format has been introduced for an OTT data session 16, determining which OTT service provider 12 is implementing the new encoding format, and/or adding the new encoding format to the list of encoding formats used by the determined OTT service provider 12.

Furthermore, in any of the example embodiments of method 300 or 350 in FIGS. 3A and 3B, at least one of the one or more OTT data sessions 16 can be a video data session 16.

Figure 4B:
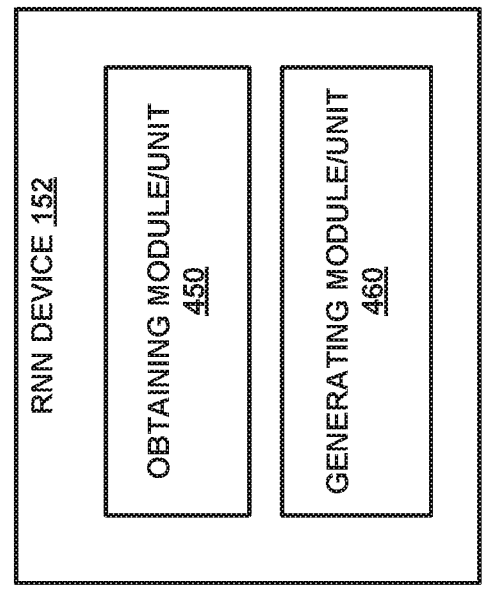
FIGS. 4A and 4B illustrate aspects of a RNN device in example embodiments of the present invention.
Figure 4A:
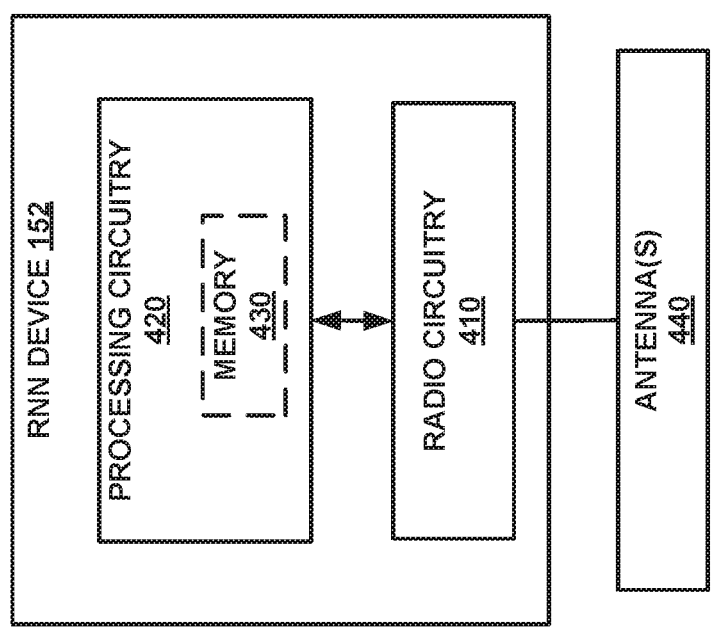

FIG. 4A illustrates additional details of a device 152 in an example RNN 150 in accordance with one or more embodiments. As shown, the device 152 includes processing circuitry (also referred to herein as a processor, one or more processors, processing unit (s) and the like) 420 and radio circuitry 410. The radio circuitry 410 is configured to transmit via one or more antennas 440. The processing circuitry 420 is configured to perform processing described above, e.g., in FIG. 3A, such as by executing instructions stored in memory 430. The processing circuitry 420 in this regard may implement certain functional means or units.

FIG. 4B illustrates the device 152 that according to other embodiments implements various functional means or units, e.g., via the processing circuitry 420 (or processor(s) or one or more processors) in FIG. 4A. As shown, these functional means or units implement the example method presented in FIG. 3A (other modules/units for doing so may not be explicitly shown). For instance, FIG. 4B shows that the device 152 can include an obtaining module/unit 450 configured to periodically obtain information corresponding to one or more over-the-top OTT data sessions 16 in the data communication system. As introduced above, the information obtained by the obtaining module/unit 450 can be obtained from one or more of a packet probe 120, a test terminal 102T, and a network node 106. Furthermore, the device 152 can include a generating module/unit 460 configured to generate at least one quality metric associated with the one or more OTT data sessions 16 based on the periodically obtained information.

Figure 5B:
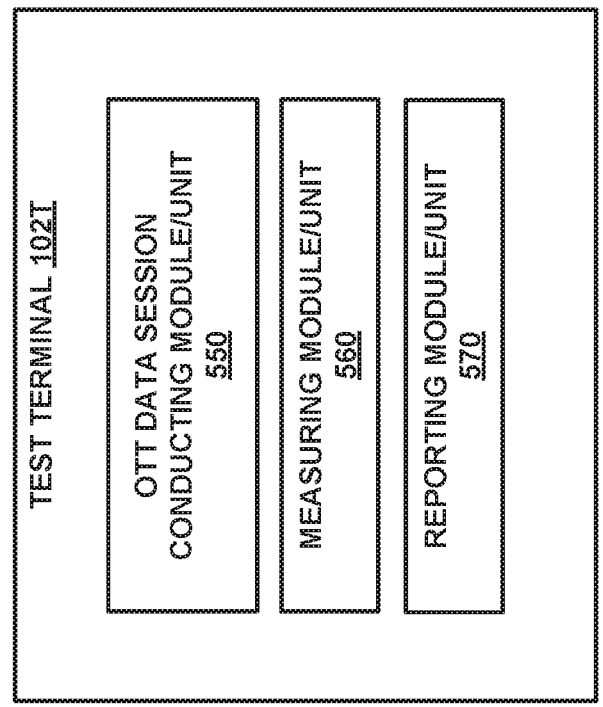
FIGS. 5A and 5B illustrate aspects of a test terminal in example embodiments of the present disclosure.
Figure 5A:
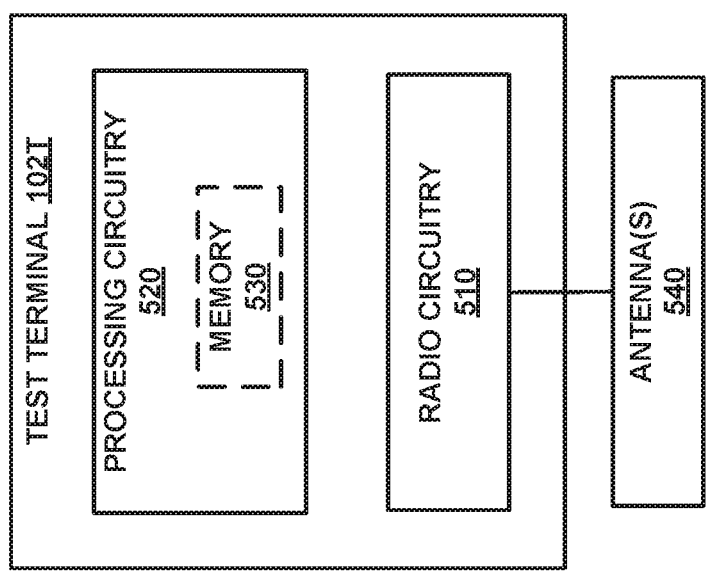

FIG. 5A illustrates additional details of a test terminal 102 (or, more generally, a wireless communication device or user equipment configured to provide feedback to RNN 150) in accordance with one or more embodiments. As shown, the test terminal 102T includes processing circuitry 520 and radio circuitry 510. The radio circuitry 510 is configured to transmit via one or more antennas 540. The processing circuitry 520 is configured to perform processing described above, e.g., in FIG. 3B, such as by executing instructions stored in memory 530. The processing circuitry 520 in this regard may implement certain functional means or units.

FIG. 5B illustrates network node 106 (e.g., a base station) that according to other embodiments implements various functional means or units, e.g., via the processing circuitry 520 in FIG. 5A. These functional means or units, e.g., for implementing the method in FIG. 3B, include an OTT data session conducting module/unit 550 configured to conduct an ongoing OTT data session 16 with each of a group of available OTT service providers 12. In addition, the functional means or units can include a measuring module/unit 560 configured, for each ongoing OTT data session 16, to measure one or more OTT data quality metrics. Furthermore, the functional means or units can include a reporting module/unit 570 configured to periodically report the one or more OTT data quality metrics for each ongoing OTT data session 16 to a recurrent neural network RNN 150 associated with the OTT data communication system 10.

A terminal 102 (including a subset of these terminals 102, test terminal 102T) according to the present disclosure is any type of device capable of communicating with a network node using radio signals. A terminal 102 may therefore refer to a user equipment (UE), machine-to-machine (M2M) device, a machine-type communications (MTC) device, a NB-IoT device, etc. A terminal 102 may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless communication device, wireless-enabled table computers, mobile terminals, smart phones, laptop-embedded equipped (LEE), laptop-mounted equipment (LME), Universal Serial Bus (USB) dongles, wireless customer-premises equipment (CPE), etc. In the discussion herein, the terms machine-to-machine (M2M) device, machine-type communication (MTC) device, wireless sensor, and sensor may also be used. It should be understood that these devices may be a terminal 102.

In an IoT scenario, a terminal 102 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that the terminal 102 (e.g., UE) as described above may perform the processing herein by implementing any functional means or units. In one embodiment, for example, the terminal 102 comprises respective circuits or circuitry configured to perform the steps shown in FIGS. 6A-6E. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Those skilled in the art will also appreciate that embodiments herein further include corresponding computer programs. A computer program comprises instructions which, when executed on at least one processor of equipment (e.g., UE or radio network equipment), cause the equipment to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of equipment, cause the equipment to perform as described above. Embodiments further include a computer program product comprising program code portions for performing the steps of any of the embodiments herein when the computer program product is executed by a computing device. This computer program product may be stored on a computer readable recording medium. The example aspects of the disclosure presented below may be included in and/or may add features to one or more embodiments presented in the disclosure above. In some cases, the example aspects of the disclosure presented below form aspects of one or more embodiments that are at least partially distinct from the one or more embodiments presented above. In any case, this Appendix forms part of the present Application.

Figure 6:
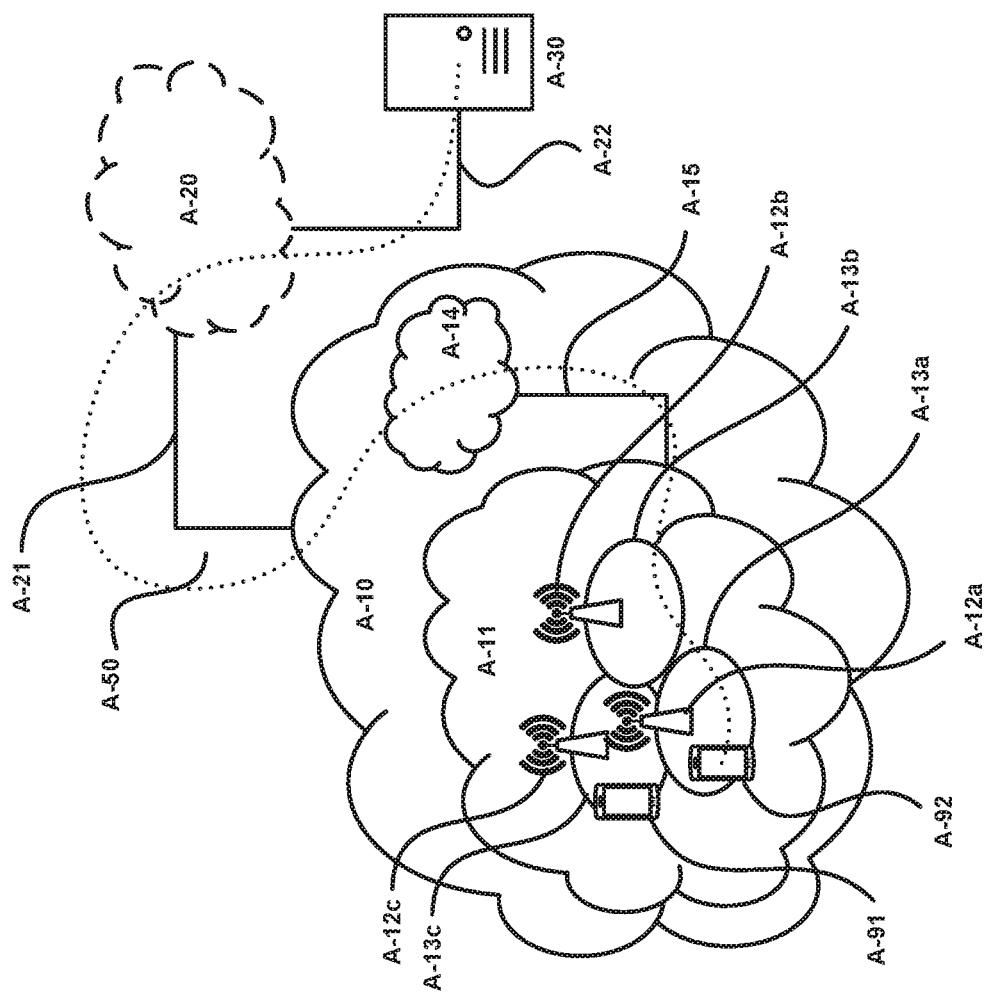
FIG. 6 schematically illustrates a telecommunication network connected via an intermediate network to a host computer.

FIG. 6 schematically illustrates a telecommunication network connected via an intermediate network to a host computer. With reference to FIG. 6, in accordance with an embodiment, a communication system includes a telecommunication network A-10, such as a 3GPP-type cellular network, which comprises an access network A-11, such as a radio access network, and a core network A-14. The access network A-11 comprises a plurality of base stations A-12a, A-12b, A-12c, such as NBs, eNBs, gNBs or other types of wireless access points (e.g. network nodes 106), each defining a corresponding coverage area A-13a, A-13b, A-13c. In an aspect, any of base stations A-12a, A-12b, A-12c, or any other base stations described herein may be considered to be a network node, for instance, if such as network node is described above in the present Application. Each base station A-12a, A-12b, A-12c is connectable to the core network A-14 over a wired or wireless connection A-15. A first user equipment (UE) A-91 (i.e. terminal 102) located in coverage area A-13c is configured to wirelessly connect to, or be paged by, the corresponding base station A-12c. A second UE A-92 in coverage area A-13a is wirelessly connectable to the corresponding base station A-12*a*. While a plurality of UEs A-91, A-92 are illustrated in this example, the disclosed embodiments are equally applicable to a situation where a sole UE is in the coverage area or where a sole UE is connecting to the corresponding base station A-12. In an aspect, any of these UEs, or any other UE described herein may be considered to be configured to perform the aspects of any UE, user terminal, client device, or mobile device described above in the present Application.

The telecommunication network A-10 is itself connected to a host computer A-30, which may be embodied in the hardware and/or software of a standalone server, a cloud-implemented server, a distributed server or as processing resources in a server farm. The host computer A-30 may be under the ownership or control of a service provider or may be operated by the service provider or on behalf of the service provider. The connections A-21, A-22 between the telecommunication network A-10 and the host computer A-30 may extend directly from the core network A-14 to the host computer A-30 or may go via an optional intermediate network A-20. The intermediate network A-20 may be one of, or a combination of more than one of, a public, private or hosted network; the intermediate network A-20, if any, may be a backbone network or the Internet; in particular, the intermediate network A-20 may comprise two or more sub-networks (not shown).

The communication system of FIG. 6 as a whole enables connectivity between one of the connected UEs A-91, A-92 and the host computer A-30. The connectivity may be described as an over-the-top (OTT) connection A-50. The host computer A-30 and the connected UEs A-91, A-92 are configured to communicate data and/or signaling via the OTT connection A-50, using the access network A-11, the core network A-14, any intermediate network A-20 and possible further infrastructure (not shown) as intermediaries. The OTT connection A-50 may be transparent in the sense that the participating communication devices through which the OTT connection A-50 passes are unaware of routing of uplink and downlink communications. For example, a base station A-12 may not or need not be informed about the past routing of an incoming downlink communication with data originating from a host computer A-30 to be forwarded (e.g., handed over) to a connected UE A-91. Similarly, the base station A-12 need not be aware of the future routing of an outgoing uplink communication originating from the UE A-91 towards the host computer A-30.

Figure 7:
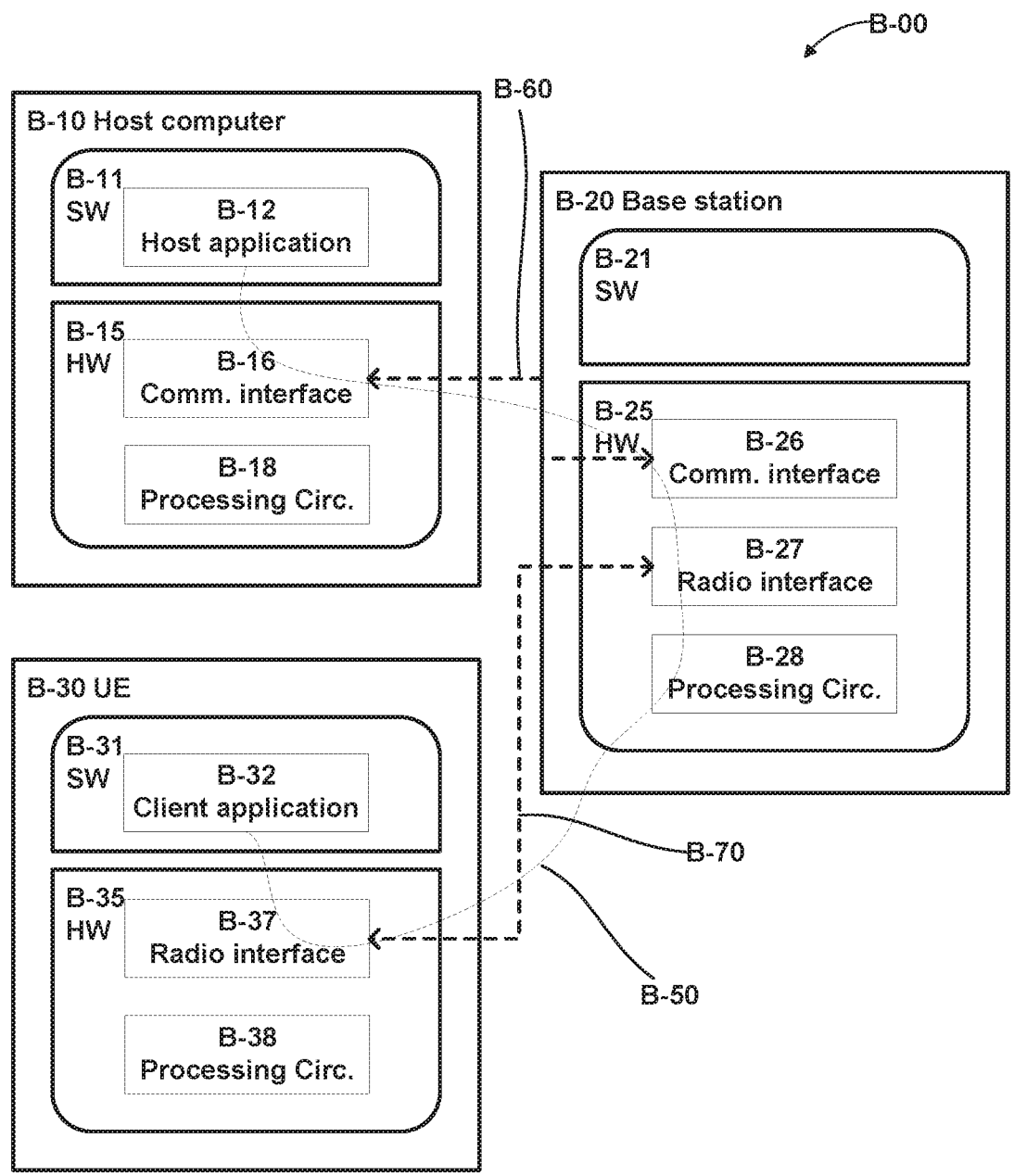
FIG. 7 is a generalized block diagram of a host computer communicating via a base station with a user equipment over a partially wireless connection.

Example implementations, in accordance with an embodiment, of the UE, base station and host computer discussed in the preceding paragraphs will now be described with reference to FIG. 7, which is shown below. FIG. 7 is a generalized block diagram of a host computer communicating via a base station with a user equipment over a partially wireless connection.

In a communication system B-00, a host computer B-10 comprises hardware B-15 including a communication interface B-16 configured to set up and maintain a wired or wireless connection with an interface of a different communication device of the communication system B-00. The host computer B-10 further comprises processing circuitry B-18, which may have storage and/or processing capabilities. In particular, the processing circuitry B-18 may comprise one or more programmable processors, application-specific integrated circuits, field programmable gate arrays or combinations of these (not shown) adapted to execute instructions. The host computer B-10 further comprises software B-11, which is stored in or accessible by the host computer B-10 and executable by the processing circuitry B-18. The software B-11 includes a host application B-12. The host application B-12 may be operable to provide a service to a remote user, such as a UE B-30 connecting via an OTT connection B-50 terminating at the UE B-30 and the host computer B-10. In providing the service to the remote user, the host application B-12 may provide user data which is transmitted using the OTT connection B-50.

The communication system B-00 further includes a base station B-20 provided in a telecommunication system and comprising hardware B-25 enabling it to communicate with the host computer B-10 and with the UE B-30. The hardware B-25 may include a communication interface B-26 for setting up and maintaining a wired or wireless connection with an interface of a different communication device of the communication system B-00, as well as a radio interface B-27 for setting up and maintaining at least a wireless connection B-70 with a UE B-30 located in a coverage area (not shown in FIG. 7) served by the base station B-20.

The communication interface B-26 may be configured to facilitate a connection B-60 to the host computer B-10. The connection B-60 may be direct or it may pass through a core network (not shown in FIG. 7) of the telecommunication system and/or through one or more intermediate networks outside the telecommunication system. In the embodiment shown, the hardware B-25 of the base station B-20 further includes processing circuitry B-28, which may comprise one or more programmable processors, application-specific integrated circuits, field programmable gate arrays or combinations of these (not shown) adapted to execute instructions. The base station B-20 further has software B-21 stored internally or accessible via an external connection.

The communication system B-00 further includes the UE B-30, which has already been referred to above. Its hardware B-35 may include a radio interface B-37 configured to set up and maintain a wireless connection B-70 with a base station serving a coverage area in which the UE B-30 is currently located. The hardware B-35 of the UE B-30 further includes processing circuitry B-38, which may comprise one or more programmable processors, application-specific integrated circuits, field programmable gate arrays or combinations of these (not shown) adapted to execute instructions. The UE B-30 further comprises software B-31, which is stored in or accessible by the UE B-30 and executable by the processing circuitry B-38.

The software B-31 includes a client application B-32. The client application B-32 may be operable to provide a service to a human or non-human user via the UE B-30, with the support of the host computer B-10. In the host computer B-10, an executing host application B-12 may communicate with the executing client application B-32 via the OTT connection B-50 terminating at the UE B-30 and the host computer B-10. In providing the service to the user, the client application B-32 may receive request data from the host application B-12 and provide user data in response to the request data. The OTT connection B-50 may transfer both the request data and the user data. The client application B-32 may interact with the user to generate the user data that it provides.

Figure 10:
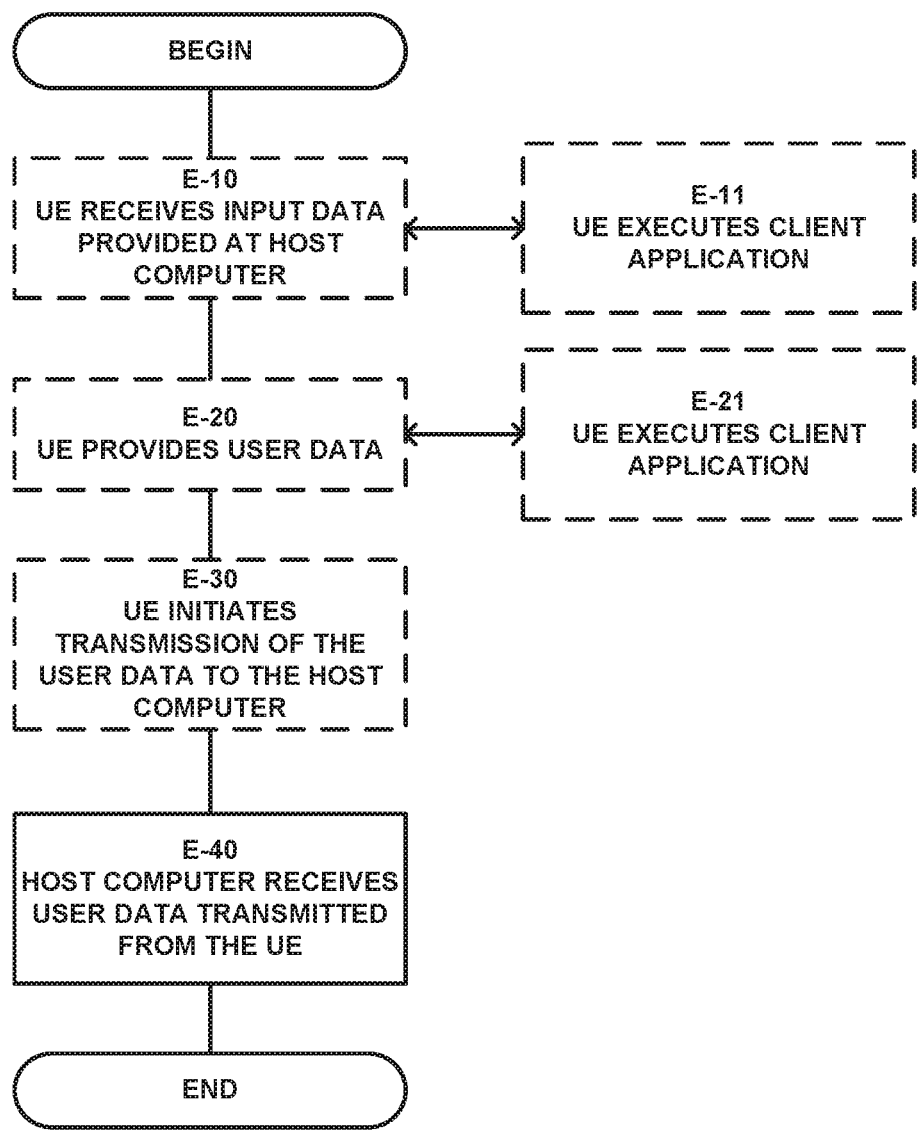

It is noted that the host computer B-10, base station B-20 and UE B-30 illustrated in FIG. 7 may be identical to the host computer A-30, one of the base stations A-12*a*, A-12*b*, A-12*c* and one of the UEs A-91, A-92 of FIG. 6, respectively. This is to say, the inner workings of these entities may be as shown in FIG. 10 and independently, the surrounding network topology may be that of FIG. 7.

In FIG. 7, the OTT connection B-50 has been drawn abstractly to illustrate the communication between the host computer B-10 and the use equipment B-30 via the base station B-20, without explicit reference to any intermediary devices and the precise routing of messages via these devices. Network infrastructure may determine the routing, which it may be configured to hide from the UE B-30 or from the service provider operating the host computer B-10, or both. While the OTT connection B-50 is active, the network infrastructure may further take decisions by which it dynamically changes the routing (e.g., on the basis of load balancing consideration or reconfiguration of the network).

The wireless connection B-70 between the UE B-30 and the base station B-20 is in accordance with the teachings of the embodiments described throughout this disclosure. One or more of the various embodiments improve the performance of OTT services provided to the UE B-30 using the OTT connection B-50, in which the wireless connection B-70 forms the last segment. More precisely, the teachings of these embodiments can improve one or more of data rate, latency, and/or power consumption associated with one or more devices and/or communications of/performed in communication system B-00, and thereby can provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring the OTT connection B-50 between the host computer B-10 and UE B-30, in response to variations in the measurement results. The measurement procedure and/or the network functionality for reconfiguring the OTT connection B-50 may be implemented in the software B-11 of the host computer B-10 or in the software B-31 of the UE B-30, or both.

In embodiments, sensors (not shown) may be deployed in or in association with communication devices through which the OTT connection B-50 passes; the sensors may participate in the measurement procedure by supplying values of the monitored quantities exemplified above, or supplying values of other physical quantities from which software B-11, B-31 may compute or estimate the monitored quantities. The reconfiguring of the OTT connection B-50 may include message format, retransmission settings, preferred routing etc.; the reconfiguring need not affect the base station B-20, and it may be unknown or imperceptible to the base station B-20.

Such procedures and functionalities may be known and practiced in the art. In certain embodiments, measurements may involve proprietary UE signaling facilitating the host computer's B-10 measurements of throughput, propagation times, latency and the like. The measurements may be implemented in that the software B-11, B-31 causes messages to be transmitted, in particular empty or 'dummy' messages, using the OTT connection B-50 while it monitors propagation times, errors etc.

FIGS. 12, 13, 14, and 15 (below) are flowcharts illustrating methods implemented in a communication system including a host computer, a base station and a user equipment.

Figure 8:
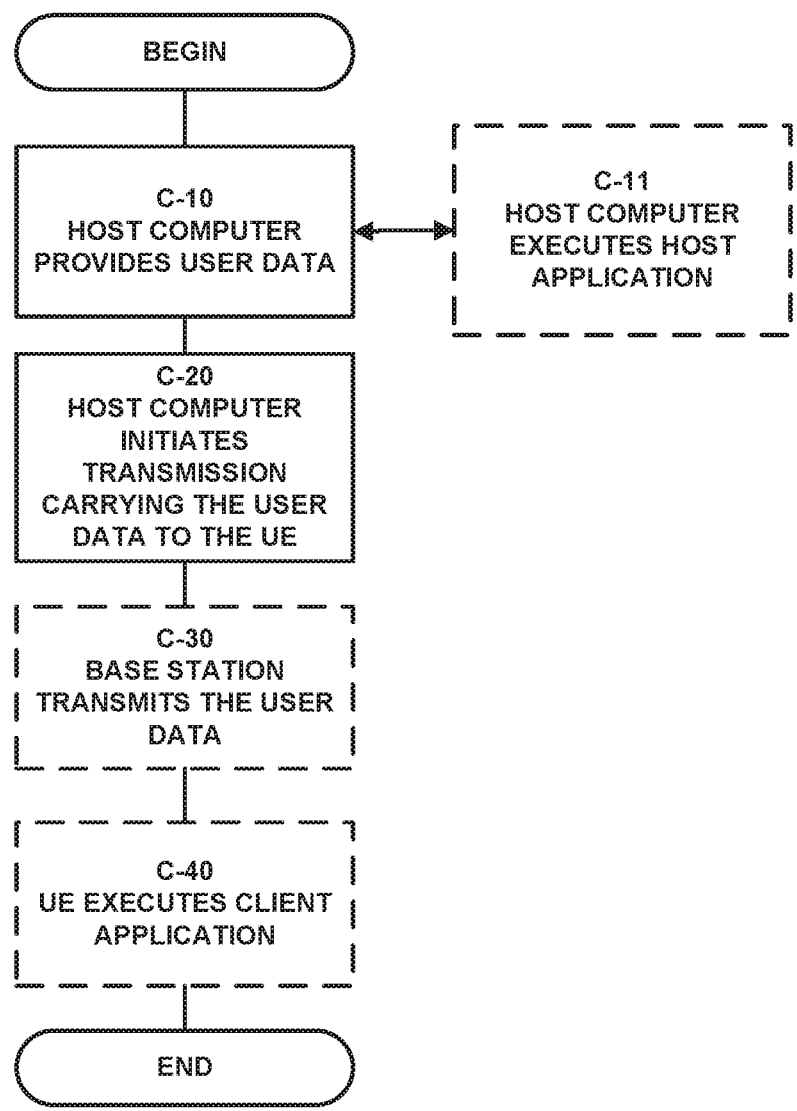
FIGS. 8, 9, 10, and 11 include flowcharts illustrating methods implemented in a communication system including a host computer, a base station and a user equipment.

FIG. 8 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 8 will be included in this section. In a first step C-10 of the method, the host computer provides user data.

In an optional substep C-11 of the first step C-10, the host computer provides the user data by executing a host application. In a second step C-20, the host computer initiates a transmission carrying the user data to the UE.

In an optional third step C-30, the base station transmits to the UE the user data which was carried in the transmission that the host computer initiated, in accordance with the teachings of the embodiments described throughout this disclosure. In an optional fourth step C-40, the UE executes a client application associated with the host application executed by the host computer.

Figure 9:
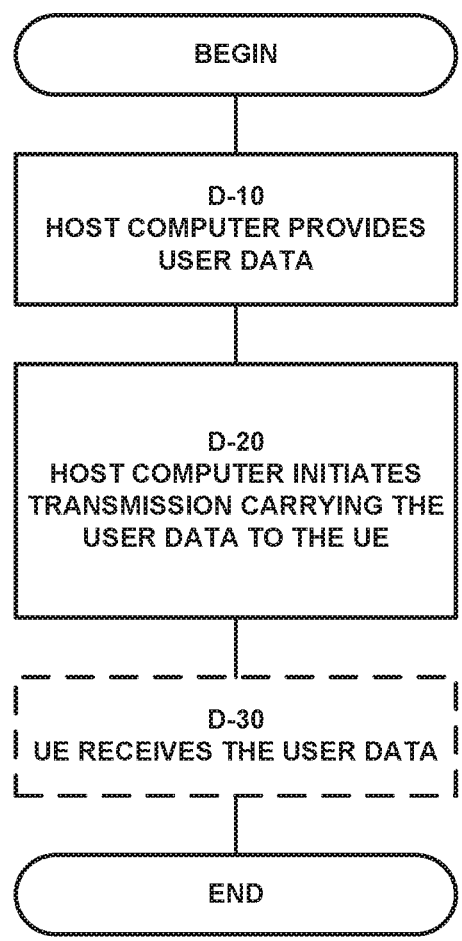

FIG. 9 is a flowchart illustrating a method implemented in a communication system, in accordance with one embodiment.

The communication system includes a host computer, a base station and a UE which may be those described with reference to FIGS. 10 and 11. For simplicity of the present disclosure, only drawing references to FIG. 9 will be included in this section. In a first step D-10 of the method, the host computer provides user data.

In an optional substep (not shown) the host computer provides the user data by executing a host application. In a second step D-20, the host computer initiates a transmission carrying the user data to the UE. The transmission may pass via the base station, in accordance with the teachings of the embodiments described throughout this disclosure. In an optional third step D-30, the UE receives the user data carried in the transmission.

FIG. 10 is a flowchart illustrating a method implemented in a communication system, in accordance with one embodiment.

The communication system includes a host computer, a base station and a UE which may be those described with reference to FIGS. 10 and 11. For simplicity of the present disclosure, only drawing references to FIG. 10 will be included in this section. In an optional first step E-10 of the method, the UE receives input data provided by the host computer. Additionally or alternatively, in an optional second step E-20, the UE provides user data. In an optional substep E-21 of the second step E-20, the UE provides the user data by executing a client application. In a further optional substep E-11 of the first step E-10, the UE executes a client application which provides the user data in reaction to the received input data provided by the host computer. In providing the user data, the executed client application may further consider user input received from the user. Regardless of the specific manner in which the user data was provided, the UE initiates, in an optional third substep E-30, transmission of the user data to the host computer. In a fourth step E-40 of the method, the host computer receives the user data transmitted from the UE, in accordance with the teachings of the embodiments described throughout this disclosure.

Figure 11:
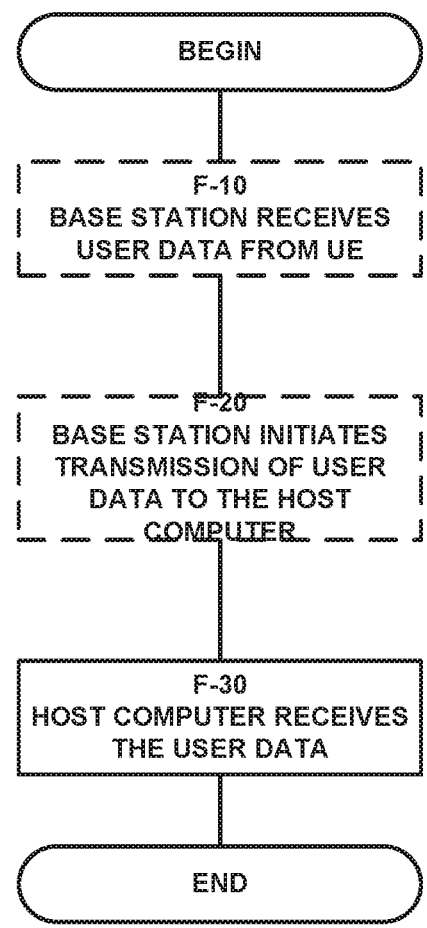

FIG. 11 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 11 will be included in this section. In an optional first step F-10 of the method, in accordance with the teachings of the embodiments described throughout this disclosure, the base station receives user data from the UE. In an optional second step F-20, the base station initiates transmission of the received user data to the host computer. In a third step F-30, the host computer receives the user data carried in the transmission initiated by the base station.

The invention claimed is:

1. A method performed by a device in a recurrent neural network (RNN) implemented in a data communication system, comprising:
periodically obtaining information corresponding to one or more over-the-top (OTT) data sessions in the data communication system,
wherein the information is obtained from a packet probe, a test terminal, and a network node, and wherein the one or more packet probe comprises an Evolved Packet System (EPS) Encryption Algorithm (EEA) probe configured to classify Transmission Control Protocol (TCP) data according to originating OTT service provider, subscriber identity, and operator identity;
training the RNN based on the obtained information;
generating at least one quality metric associated with the one or more OTT data sessions based on the trained RNN,
wherein generating the at least one quality metric is based on a junction weight of neurons of the RNN, and
wherein the RNN is configured to continuously update its output data values as informed by previous values input by one or more packet probes and test terminal measurements.

2. The method of claim 1, wherein generating the at least one quality metric comprises analyzing a sliding temporal window of the obtained information, wherein the sliding window is temporally moved periodically; and wherein periodically obtaining the information comprises receiving at least some of the information once every second.

3. The method of claim 1, further comprising:
aggregating the at least one quality metric according to defined categories; and
identifying a root cause of an issue with the one or more OTT data sessions based on the aggregated at least one quality metric.

4. The method of claim 1, wherein the information is obtained from two or more sources and further comprising correlating the information received from the two or more sources to at least one of a same OTT data session or time.

5. The method of claim 1, wherein the RNN further comprises a hidden layer managing feedback representing a previous state of the RNN; and
wherein the at least one quality metric comprises at least one of a data buffering level or a data stall time metric.

6. A device in a recurrent neural network (RNN) implemented in a data communication system, the device configured to:
periodically obtain information corresponding to one or more over-the-top (OTT) data sessions in the data communication system,
wherein the information is obtained from a packet probe, a test terminal, and a network node, and wherein the one or more packet probe comprises an Evolved Packet System (EPS) Encryption Algorithm (EEA) probe configured to classify Transmission Control Protocol (TCP) data according to originating OTT service provider, subscriber identity, and operator identity;
train the RNN based on the obtained information;
generate at least one quality metric associated with the one or more OTT data sessions based on the trained RNN,
wherein the at least one quality metric is generated based on a junction weight of neurons of the RNN, and
wherein the RNN is configured to continuously update its output data values as informed by previous values input by one or more packet probes and test terminal measurements.

7. The device of claim 6, wherein
the generation of the at least one quality metric comprises being configured to analyze a sliding temporal window of the obtained information,
wherein the sliding window is temporally moved periodically; and
wherein being configured to periodically obtain the information comprises being configured to receive at least some of the information once every second.

8. The device of claim 6, the device is further configured to:
aggregate the at least one quality metric according to defined categories; and
identify a root cause of an issue with the one or more OTT data sessions based on the aggregated at least one quality metric.

9. The device of claim 6, wherein the information is obtained from two or more sources and the device correlating the information received from the two or more sources to at least one of a same OTT data session or time.

10. The device of claim 6, wherein the RNN comprises a hidden layer managing feedback representing a previous state of the RNN; and wherein the at least one quality metric comprises at least one of a data buffering level or a data stall time metric.

* * * * *